US012760698B2

(12) United States Patent
Oshima

(10) Patent No.: US 12,760,698 B2
(45) Date of Patent: Oct. 13, 2026

(54) EXHAUST GAS RECIRCULATION DEVICE AND EXHAUST GAS RECIRCULATION METHOD FOR INTERNAL COMBUSTION ENGINE

(71) Applicant: TOYOTA JIDOSHA KABUSHIKI KAISHA, Toyota (JP)

(72) Inventor: Tomoya Oshima, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 24 days.

(21) Appl. No.: 18/982,454

(22) Filed: Dec. 16, 2024

(65) Prior Publication Data

US 2025/0207547 A1 Jun. 26, 2025

(30) Foreign Application Priority Data

Dec. 20, 2023 (JP) ................................ 2023-214839

(51) Int. Cl.
*F02M 26/47* (2016.01)
*F02M 26/22* (2016.01)
*F02M 26/00* (2016.01)

(52) U.S. Cl.
CPC ............ *F02M 26/47* (2016.02); *F02M 26/22* (2016.02); *F02M 2026/004* (2016.02)

(58) Field of Classification Search
CPC ................... F02M 26/47; F02M 26/22; F02M 2026/004
See application file for complete search history.

(56) References Cited

U.S. PATENT DOCUMENTS 3,990,418 A * 11/1976 Nohira .................. F02M 26/58 251/285
8,938,964 B2 * 1/2015 Kanou .................. F02M 26/33 60/605.2
2010/0031937 A1 * 2/2010 Oohashi ................ F02M 26/44 123/568.11
2011/0005503 A1 * 1/2011 Harden ................. F02M 26/25 123/568.21
2017/0022940 A1 1/2017 Minami et al.
2021/0231075 A1 * 7/2021 Toya ...................... F02D 41/18
2023/0043144 A1 * 2/2023 Tateishi ............... F16K 31/535

FOREIGN PATENT DOCUMENTS

JP S 58-136649 U 9/1983
JP 2006-299890 A 11/2006
JP 2007-092597 A 4/2007
JP 2015-197078 A 11/2015

* cited by examiner

*Primary Examiner* — Syed O Hasan
(74) *Attorney, Agent, or Firm* — Finnegan, Henderson, Farabow, Garrett, and Dunner, LLP

(57) ABSTRACT

An exhaust gas recirculation device and an exhaust gas recirculation method for an internal combustion engine are provided. An EGR cooler performs heat exchange between coolant of the internal combustion engine and EGR gas. An EGR valve is provided in a section of an EGR passage that is between an intake passage and the EGR cooler. The EGR valve includes a temperature sensitive portion, with which the EGR gas comes into contact. An EGR gas temperature is a temperature of the EGR gas in contact with the temperature sensitive portion. A valve body opens the EGR valve when the EGR gas temperature is higher than a prescribed temperature, thereby allowing the EGR gas to flow.

8 Claims, 4 Drawing Sheets

EXHAUST GAS RECIRCULATION DEVICE AND EXHAUST GAS RECIRCULATION METHOD FOR INTERNAL COMBUSTION ENGINE

CROSS-REFERENCE TO RELATED APPLICATIONS

This application is based upon and claims the benefit of priority from prior Japanese Patent Application No. 2023-214839, filed on Dec. 20, 2023, the entire contents of which are incorporated herein by reference.

BACKGROUND

1. Field

The present disclosure relates to an exhaust gas recirculation device for an internal combustion engine and an exhaust gas recirculation method for an internal combustion engine.

2. Description of Related Art

Japanese Laid-Open Patent Publication No. 2007-92597 discloses an exhaust gas recirculation device. The exhaust gas recirculation device includes an EGR passage, an EGR cooler, and an EGR valve. The EGR passage delivers some of exhaust gas of the internal combustion engine to the intake passage as EGR gas. The EGR cooler is provided in the EGR passage and performs heat exchange between the coolant of the internal combustion engine and the EGR gas. The EGR valve opens and closes the EGR passage.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an exhaust gas recirculation device for an internal combustion engine includes an EGR passage, an EGR cooler, and an EGR valve. The EGR passage delivers some of exhaust gas of the internal combustion engine to an intake passage of the internal combustion engine as an EGR gas. The EGR cooler is provided in the EGR passage and performs heat exchange between coolant of the internal combustion engine and the EGR gas. The EGR valve is provided in a section of the EGR passage that is between the intake passage and the EGR cooler. The EGR valve includes a temperature sensitive portion and a valve body. The EGR gas comes into contact with the temperature sensitive portion. An EGR gas temperature is a temperature of the EGR gas that comes into contact with the temperature sensitive portion. The valve body opens the EGR valve when the EGR gas temperature is higher than a prescribed temperature, thereby allowing the EGR gas to flow.

Another aspect of the present disclosure provides an exhaust gas recirculation method for an internal combustion engine including similar characteristics as the exhaust gas recirculation device for an internal combustion engine.

Even when the temperature of the coolant is relatively low, the exhaust gas recirculation device and the exhaust gas recirculation method for the internal combustion engine are capable of delivering the EGR gas to the intake passage, while suppressing the generation of condensed water.

An EGR valve may include a valve actuator that deforms in accordance with the temperature of the coolant, and a valve body. When the temperature of the coolant is higher than or equal to a specified value, the valve actuator is deformed. Accordingly, the valve body opens the EGR valve. As a result, the EGR gas is drawn into the intake passage. When the EGR gas is drawn into the intake passage by the exhaust gas recirculation device, the combustion temperature of the air-fuel mixture is lowered. Accordingly, the amount of NOx generated in the internal combustion engine decreases.

When the temperature of the EGR gas that has passed through the EGR cooler falls to or below the dew point temperature, condensed water is generated in the EGR gas. In a state in which the EGR gas temperature falls to or below the dew point temperature, the EGR valve is normally closed in the related art.

As the flow rate of the EGR gas in the EGR passage increases, the cooling efficiency of the EGR cooler decreases. In this case, the EGR gas temperature is unlikely to decrease when the EGR gas passes through the EGR cooler. As a result, the EGR gas temperature may exceed the dew point temperature. In a state in which the EGR gas temperature is relatively high, condensed water is unlikely to be generated, and thus the EGR gas can be drawn into the intake passage. However, in the related art, when the coolant temperature of the internal combustion engine is relatively low, the EGR valve does not open. Therefore, even in a state in which condensed water is unlikely to be generated, the EGR gas cannot be drawn into the intake passage. The above-described configuration resolves this issue.

Other features and aspects will be apparent from the following detailed description, the drawings, and the claims.

BRIEF DESCRIPTION OF THE DRAWINGS

FIG. 3A shows changes in the EGR gas temperature and the coolant temperature of the EGR cooler shown in FIG. 1, and FIG. 3B shows changes in the pressure loss of the EGR passage shown in FIG. 1.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An exhaust gas recirculation device for an internal combustion engine and an exhaust gas recirculation method for an internal combustion engine according to one embodiment will now be described with reference to FIGS. 1 to 3B.

Configuration of Internal Combustion Engine

Figure 1:
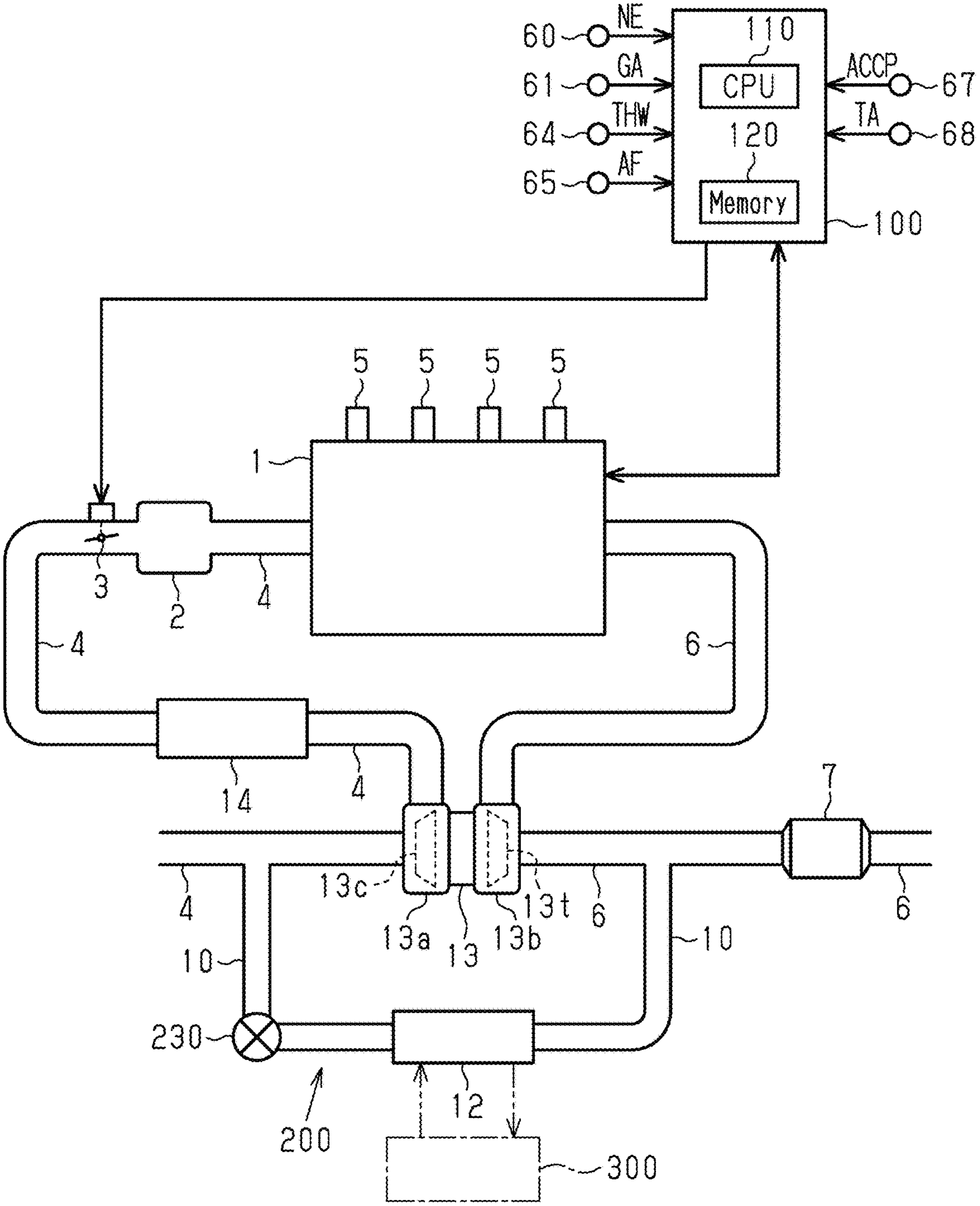
FIG. 1 is a schematic diagram showing the configuration of an exhaust gas recirculation device for an internal combustion engine according to one embodiment.

FIG. 1 shows an internal combustion engine 1 provided with an exhaust gas recirculation device according to the present embodiment. The internal combustion engine 1 uses hydrogen gas as fuel.

The internal combustion engine 1 includes fuel injection valves 5 for supplying hydrogen gas as engine fuel to combustion chambers.

An intake passage 4 is connected to the internal combustion engine 1. A surge tank 2 is provided on the intake passage 4. A throttle valve 3 for adjusting the amount of intake air is provided in a section of the intake passage 4 that is upstream of the surge tank 2. A direction toward the internal combustion engine 1 along the intake passage 4 is referred to as a downstream direction of the intake passage 4.

An exhaust passage 6 is connected to the internal combustion engine 1. The exhaust passage 6 is provided with a forced-induction device 13 that compresses intake air by using exhaust pressure. The forced-induction device 13 is a known variable displacement forced-induction device, and is capable of adjusting the boost pressure. A direction away from the internal combustion engine 1 along the exhaust passage 6 is referred to as a downstream direction of the exhaust passage 6.

The forced-induction device 13 includes a compressor housing 13*a* and a turbine housing 13*b*. The compressor housing 13*a* accommodates a compressor wheel 13*c*. The turbine housing 13*b* accommodates a turbine wheel 13*t*. The turbine housing 13*b* is provided in the exhaust passage 6. A catalyst 7 for purifying exhaust gas is provided in a section of the exhaust passage 6 that is downstream of the turbine housing 13*b*.

The compressor housing 13*a* is provided in a section of the intake passage 4 that is upstream of the throttle valve 3. An intercooler 14 is provided in the intake passage 4 between the compressor housing 13*a* and the throttle valve 3. The intercooler 14 cools the intake air having an increased temperature due to compression.

The internal combustion engine 1 includes an exhaust gas recirculation device 200 (hereinafter, referred to as an EGR device) that delivers some of exhaust gas to the intake passage 4 as EGR gas.

The EGR device 200 includes an EGR passage 10 that delivers the EGR gas to the intake passage 4. When the EGR passage 10 delivers the EGR gas to the intake passage 4, some of the exhaust gas in the exhaust passage 6 flows through the EGR passage 10 from the exhaust passage 6 toward the intake passage 4. That is, the flow direction of the EGR passage 10 is a direction from the exhaust passage 6 toward the intake passage 4 along the EGR passage 10. A direction toward the exhaust passage 6 along the EGR passage 10 is referred to as an upstream direction of the EGR passage 10. A direction toward the intake passage 4 along the EGR passage 10 is referred to as a downstream direction of the EGR passage 10.

An inlet of the EGR passage 10 branches from a section of the exhaust passage 6 that is downstream of the turbine housing 13*b*. An outlet of the EGR passage 10 is connected to a section of the intake passage 4 that is upstream of the compressor housing 13*a*.

The EGR passage 10 is provided with an EGR cooler 12 that performs heat exchange between the coolant of the internal combustion engine 1 and the EGR gas. The EGR cooler 12 is connected to a coolant circuit 300, in which the coolant of the internal combustion engine 1 circulates.

An EGR valve 230 that opens and closes the EGR passage 10 is provided in a section of the EGR passage 10 that is between the intake passage 4 and the EGR cooler 12. The structure of the EGR valve 230 will be described later.

When the EGR valve 230 opens, some of the exhaust gas passing through the exhaust passage 6 flows into the EGR passage 10 as EGR gas. The EGR gas that has flowed into the EGR passage 10 is subjected to heat exchange in the EGR cooler 12, and then delivered to the intake passage 4. Thus, the EGR gas that has flowed into the EGR passage 10 is again drawn into the combustion chambers of the internal combustion engine 1 together with fresh air. When the EGR gas is drawn into the combustion chambers, the combustion temperature of the air-fuel mixture decreases. This suppresses the generation of NOx in the internal combustion engine 1.

The engine operating state and the like of the internal combustion engine 1 are detected by various sensors. For example, a crank angle sensor 60 detects a crank angle, which is a rotation angle of a crankshaft of the internal combustion engine 1. An air flow meter 61 detects an intake air amount GA, which is the amount of air taken into the internal combustion engine 1. A coolant temperature sensor 64 detects a coolant temperature THW, which is the temperature of the coolant of the internal combustion engine 1. An air-fuel ratio sensor 65 is provided in a section of the exhaust passage 6 that is upstream of the catalyst 7. The air-fuel ratio sensor 65 detects an air-fuel ratio AF. An accelerator sensor 67 detects an accelerator operation amount ACCP, which is the depression amount of the accelerator pedal. A throttle sensor 68 detects a throttle opening degree TA, which is an opening degree of the throttle valve 3.

The controller 100 controls the internal combustion engine 1. Specifically, the controller 100 operates various devices to be operated, such as the throttle valve 3, the fuel injection valves 5, the ignition plugs of the internal combustion engine 1, and the forced-induction device 13.

The controller 100 includes a CPU 110 that performs computation processes and a memory 120 that stores control programs for control. The controller 100 executes processes related to various types of control by the CPU 110 executing programs or program products stored in the memory 120. The CPU 110 is processing circuitry or a processor.

The controller 100 receives detection signals from the various types of sensors described above.

The hydrogen gas is the fuel for the internal combustion engine 1. The flammable range of an air-fuel mixture containing hydrogen gas is broader than that of gasoline. Therefore, the air-fuel mixture containing hydrogen gas can be burned even when it is leaner than an air-fuel mixture containing gasoline. Accordingly, the controller 100 adjusts the output of the internal combustion engine 1 through the following combustion control.

The controller 100 calculates a requested output Pe based on the accelerator operation amount ACCP and the like. The requested output Pe is a requested value of the output of the internal combustion engine 1. The controller 100 sets a requested injection amount Qd based on the requested output Pe. The requested injection amount Qd is a target value of the fuel injection amount injected by the fuel injection valves 5. The controller 100 calculates a requested air amount GAd based on a target air-fuel ratio AFt and the requested injection amount Qd. The requested air amount GAd is a target value of the intake air amount required to achieve the target air-fuel ratio AFt. The target air-fuel ratio AFt of the present embodiment is a lean air-fuel ratio, with an air excess ratio $\lambda$ of, for example, 2.5 to 3.0. The air excess ratio is equal to, for example, a value obtained by dividing the actual air-fuel ratio by the stoichiometric air-fuel ratio. The controller 100 controls the fuel injection valves 5 so as to achieve the requested injection amount Qd. The controller 100 controls the opening degree of the throttle valve 3 and the boost pressure of the forced-induction device 13 so as to achieve the requested air amount GAd. The output of the internal combustion engine 1 is adjusted by changing the air-fuel ratio of the air-fuel mixture through adjustment of the fuel injection amount and the intake air amount.

Structure of EGR Valve

Figure 2:
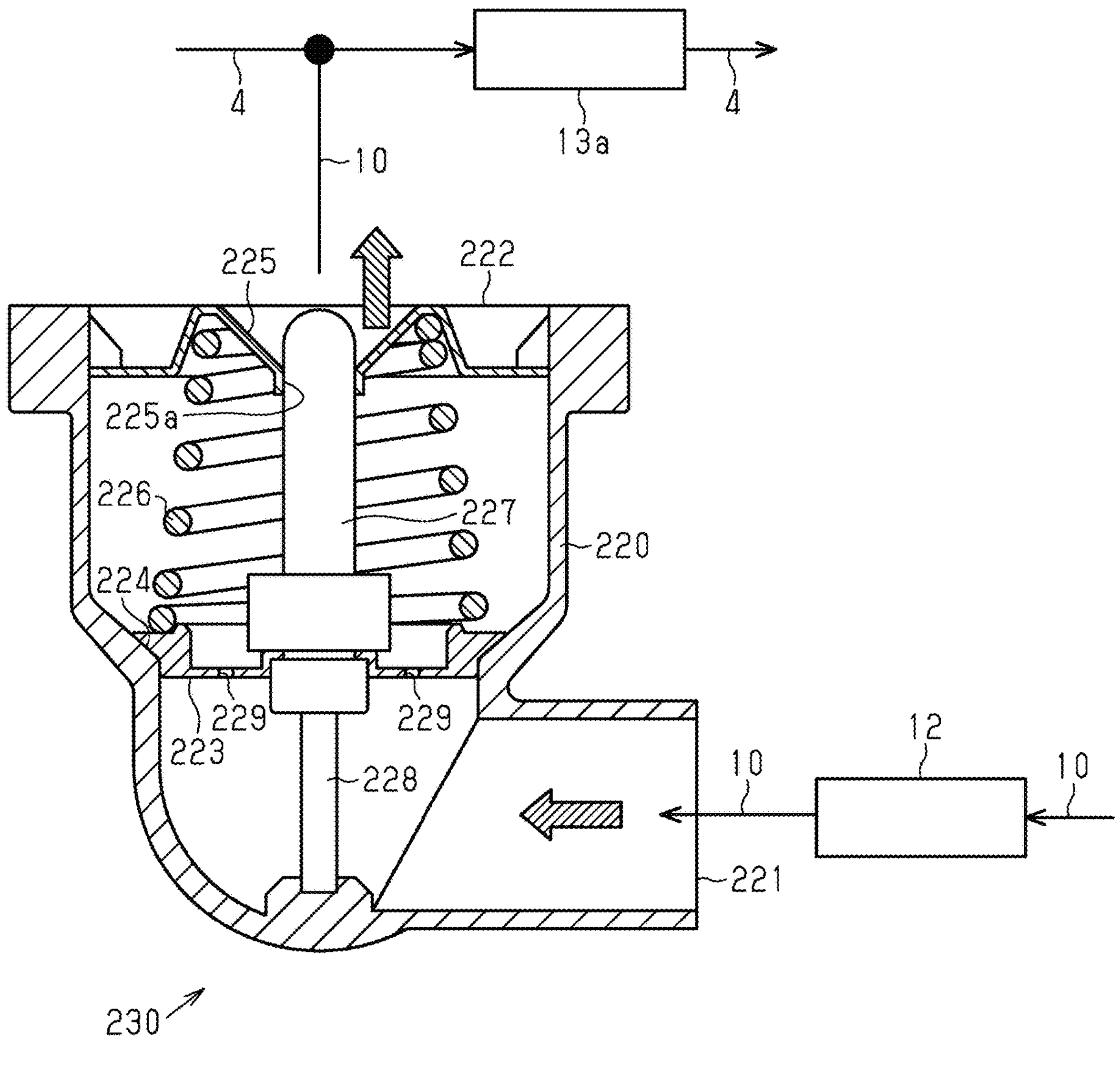
FIG. 2 is a cross-sectional view of the EGR valve shown in FIG. 1.

FIG. 2 shows a cross-sectional structure of the EGR valve 230.

As shown in FIG. 2, the EGR valve 230 includes an EGR valve housing 220 that defines a part of the EGR passage 10. The EGR valve housing 220 is formed to have, for example, a tubular shape. The EGR valve housing 220 includes an EGR inlet 221 as an upstream end of the tube and an EGR outlet 222 as a downstream end of the tube. The upstream direction of the EGR valve housing 220 is a direction toward the exhaust passage 6. The downstream direction of the EGR valve housing 220 is a direction toward the intake passage 4. The EGR gas that has passed through the EGR cooler 12 flows into the EGR inlet 221. The EGR gas flows out from the EGR outlet 222 toward a section of the EGR passage 10 connected to the intake passage 4.

A displaceable valve body 223 is installed inside the EGR valve housing 220. The valve body 223 includes a valve body through-hole 229. The valve body through-hole 229 is provided so that a minute amount of EGR gas can pass through the valve body 223. Therefore, even in a state in which the valve body 223 closes the EGR valve 230, the EGR gas that has passed through the EGR cooler 12 passes through the valve body through-hole 229, and thus can come into contact with a temperature sensitive portion 227 described later. That is, the valve body through-hole 229 extends through the valve body 223 from the upstream side to the downstream side in the flow of the EGR gas. The diameter of the valve body through-hole 229 is set based on the following hole-diameter condition. The hole-diameter condition assumes that the EGR gas passing through the valve body through-hole 229 while the valve body 223 is closing the EGR valve 230 contains condensed water. The hole-diameter condition requires that the amount of condensed water in the EGR gas is less than the minimum amount of condensed water that could adversely affect the internal combustion engine 1. Examples of the adverse effects of the condensed water on the internal combustion engine 1 include corrosion of components of the internal combustion engine 1 and peripheral components, occurrence of misfires, and erosion of the compressor wheel 13*c*.

An EGR valve seat 224 is provided on the inner wall of the EGR valve housing 220. The valve body 223 can be brought into contact with the EGR valve seat 224. The valve body 223 closes the EGR valve 230 when in a contact position, in which the valve body 223 is in contact with the EGR valve seat 224. The closed EGR valve 230 blocks most of the flow of EGR gas from the EGR inlet 221 to the EGR outlet 222. When the valve body 223 is positioned away from the EGR valve seat 224, the EGR valve 230 is in an open state. When open, the EGR valve 230 allows EGR gas to flow from the EGR inlet 221 to the EGR outlet 222. That is, when the EGR valve 230 is open, the EGR gas is fully drawn into the intake passage 4.

The EGR valve housing 220 incorporates a spring seat 225 at a position closer to the EGR outlet 222 than the valve body 223. In other words, the spring seat 225 is located downstream of the EGR valve seat 224. Multiple seat holes including a center hole 225*a* extend through the spring seat 225. The seat holes other than the center hole 225*a* are not shown. These seat holes allow EGR gas to flow from the upstream side to the downstream side with respect to the spring seat 225 located in the EGR valve housing 220. Additionally or alternatively, a gap may be provided between the spring seat 225 and the inner surface of the EGR valve housing 220. This gap may allow EGR gas to flow from the upstream side to the downstream side with respect to the spring seat 225 located in the EGR valve housing 220.

A valve spring 226 is interposed between the valve body 223 and the spring seat 225. The valve spring 226 urges the valve body 223 toward the EGR valve seat 224.

The EGR valve housing 220 accommodates a temperature sensitive portion 227 between the valve body 223 and the spring seat 225. The temperature sensitive portion 227 is located downstream of the valve body 223 in the flow direction of EGR gas. The temperature sensitive portion 227 is fixed to the valve body 223. The temperature sensitive portion 227 is inserted into the center hole 225*a* of the spring seat 225 so as to be movable relative to the spring seat 225. In FIG. 2, the temperature sensitive portion 227 extends in a rod shape from the valve body 223 toward the center hole 225*a* of the spring seat 225. The downstream end of the temperature sensitive portion 227 is inserted into the center hole 225*a* of the spring seat 225.

Wax, which is a temperature sensitive material, is sealed inside the temperature sensitive portion 227. A guide bar 228 is fixed to a section of the inner surface of the EGR valve housing 220 that is upstream of the EGR valve seat 224. The guide bar 228 extends, for example, from the inner surface of the EGR valve housing 220 toward the center of the valve body 223, so as to be inserted into the temperature sensitive portion 227. The temperature sensitive portion 227 includes an insertion recess into which the downstream end of the guide bar 228 is inserted. The EGR gas comes into contact with the temperature sensitive portion 227. Therefore, when the temperature of the EGR gas in contact with the temperature sensitive portion 227 is relatively low, the wax sealed inside the temperature sensitive portion 227 solidifies and contracts. When the temperature of the EGR gas that contacts the temperature sensitive portion 227 is relatively high, the wax inside the temperature sensitive portion 227 melts and expands.

The amount of insertion of the guide bar 228 into the temperature sensitive portion 227 changes due to the change in the volume of the wax inside the temperature sensitive portion 227. When the amount of insertion of the guide bar 228 into the temperature sensitive portion 227 changes, both the temperature sensitive portion 227 and the valve body 223 are displaced with respect to the EGR valve seat 224. The displacement of the valve body 223 causes the valve body 223 to open and close the EGR valve 230. Specifically, when the EGR gas temperature increases and reaches a prescribed valve opening temperature Tref, the wax of the temperature sensitive portion 227 melts and expands. Accordingly, the valve body 223 opens the EGR valve 230 against the urging force of the valve spring 226. The valve opening temperature Tref is, for example, the lowest temperature of EGR gas at which the generation of condensed water is suppressed.

In other words, when the temperature of the EGR gas in contact with the temperature sensitive portion 227 is higher than the valve opening temperature Tref, which is a prescribed temperature, the valve body 223 opens the EGR valve 230. This allows the EGR gas to flow.

Operation of Present Embodiment

Figures 3A, 3B:
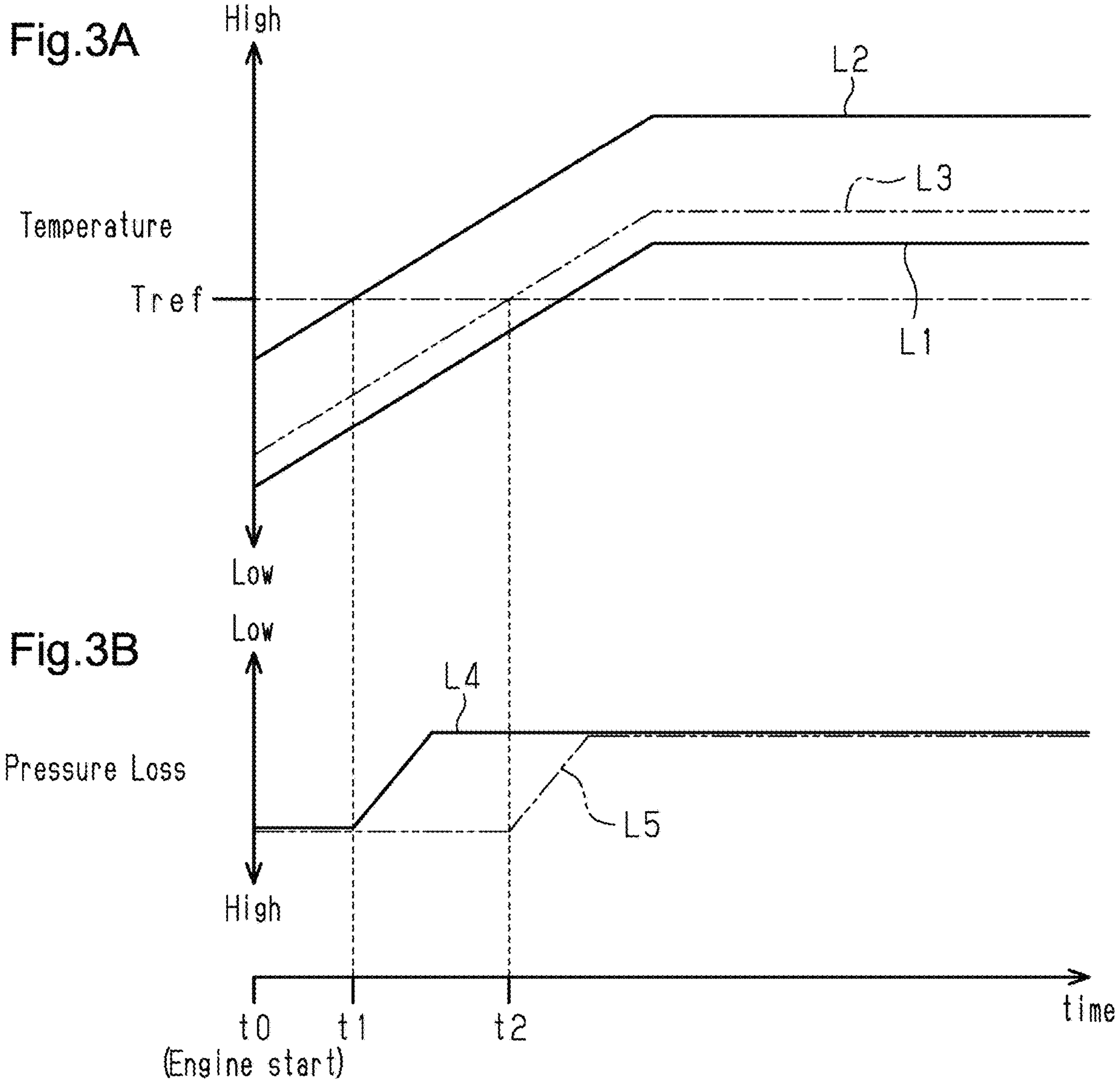
FIG. 3A and FIG. 3B show a timing diagram for explaining operation of the EGR valve shown in FIG. 2, where

FIG. 3A and FIG. 3B illustrate changes in various parameters of the internal combustion engine 1 from the initiation of the engine startup process. A state in which the flow rate of the EGR gas flowing through the EGR passage 10 toward the EGR valve 230 is relatively high may be referred to as a high EGR flow rate state. In the high EGR flow rate state, for example, the gas pressure of the EGR gas flowing toward the EGR valve 230 is relatively high. The state in which the EGR gas flow rate is relatively high includes a state in which the exhaust flow rate is relatively high. A state in which the exhaust flow rate is relatively high includes, for example, a state in which the internal combustion engine 1 is operated at a high rotation speed and a state in which the internal combustion engine 1 is operated under a high load. A state in which the flow rate of the EGR gas flowing through the EGR passage 10 is lower than that in the high EGR flow rate state may be referred to as a low EGR flow rate state.

A first line L1 shown in FIG. 3A indicates changes in the temperature of the coolant supplied to the EGR cooler 12. A second line L2 shown in FIG. 3A indicates changes in the gas temperature of the EGR gas that has passed through the EGR cooler 12 in the high EGR flow rate state. A third line L3 shown in FIG. 3A indicates changes in the gas temperature of the EGR gas that has passed through the EGR cooler 12 in the low EGR flow rate state. A fourth line L4 shown in FIG. 3B indicates changes in the pressure loss of the EGR passage 10 in the high EGR flow rate state. A fifth line L5 shown in FIG. 3B indicates changes in the pressure loss of the EGR passage 10 in the low EGR flow rate state.

As shown in FIG. 3A and FIG. 3B, when the internal combustion engine 1 is started at a point in time to, the temperature of the coolant of the internal combustion engine 1 increases. Similarly, the coolant temperature of the EGR cooler 12 indicated by the first line L1 increases. When the increase in the temperature of the coolant eventually ceases, that is, when the temperature increase rate is relatively small, the increase in the temperature of the coolant of the EGR cooler 12 also ceases.

The temperature of the EGR gas indicated by the third line L3 also increases in accordance with the increase in the coolant temperature of the EGR cooler 12. In the low EGR flow rate state, the cooling efficiency of the EGR cooler 12 is relatively high. In this case, the difference between the coolant temperature of the EGR cooler 12, indicated by the first line L1, and the gas temperature of the EGR gas, indicated by the third line L3, is relatively small. When the gas temperature reaches the valve opening temperature Tref at a second point in time t2, the EGR valve 230 starts to open. Therefore, as indicated by the fifth line L5, the pressure loss of the EGR passage 10 starts to decrease at the second point in time t2. In other words, the EGR gas starts being fully drawn into the EGR valve 230 at the second point in time t2. Thereafter, when the EGR valve 230 fully opens, the decrease in pressure loss of the EGR passage 10 ceases. In other words, the pressure loss of the EGR passage 10 remains constant. In a first comparative example, for example, coolant, rather than EGR gas, comes into contact with a temperature sensitive portion of an EGR valve. In the low EGR flow rate state, the difference between the coolant temperature (L1) of the EGR cooler 12 and the gas temperature (L3) of the EGR gas is relatively small. In the low EGR flow rate state, the opening timing of the EGR valve 230 is substantially the same as the opening timing of the EGR valve of the first comparative example.

In contrast, in the high EGR flow rate state, the cooling efficiency of the EGR cooler 12 decreases. Accordingly, the difference between the coolant temperature of the EGR cooler 12, indicated by the first line L1, and the gas temperature of the EGR gas, indicated by the second line L2, is relatively large. As a result, the temperature of the EGR gas is unlikely to decrease when the EGR gas passes through the EGR cooler 12. For example, the EGR gas temperature is higher than the dew point temperature. In a state in which the EGR gas temperature is higher than the dew point temperature, condensed water is unlikely to be generated. In this case, the EGR gas can be fully drawn into the EGR valve 230. The gas temperature of the EGR gas in the high EGR flow rate state is higher than the gas temperature of the EGR gas in the low EGR flow rate state. Therefore, the EGR gas temperature reaches the valve opening temperature Tref at a first point in time t1 earlier than the second point in time t2. When the EGR gas temperature reaches the valve opening temperature Tref, the EGR valve 230 starts to open. Therefore, as indicated by the fourth line L4, the pressure loss of the EGR passage 10 starts to decrease at the first point in time t1. In other words, the EGR gas starts being fully drawn into the EGR valve 230 at the first point in time t1. The time (t1) at which the EGR gas starts to be drawn into the EGR valve 230 in the high EGR flow rate state is earlier than the time (t2) at which the EGR gas starts to be drawn into the EGR valve 230 in the low EGR flow rate state. In the fully open state of the EGR valve 230, the decrease in the pressure loss of the EGR passage 10 ceases. Accordingly, the pressure loss of the EGR passage 10 is a constant value.

Advantages of Present Embodiment (1) When the temperature of the EGR gas in contact with the temperature sensitive portion 227 is higher than the prescribed temperature, the valve body 223 opens the EGR valve 230. Therefore, even when the coolant temperature is relatively low, the EGR gas can be drawn into the intake passage 4 in a state in which the generation of condensed water is suppressed.

(2) In the high EGR flow rate state, the flow rate of the EGR gas flowing toward the EGR valve 230 is relatively high. In contrast, in the low EGR flow rate state, the flow rate of the EGR gas flow rate is relatively low. The time at which the EGR gas is drawn into the intake passage 4 is earlier in the high EGR flow rate state than in the low EGR flow rate state. This allows a large amount of EGR gas to be drawn into the intake passage 4 at a relatively early stage.

(3) The valve body 223 includes the valve body through-hole 229. Therefore, even when the valve body 223 closes the EGR valve 230, the EGR gas can pass through the valve body through-hole 229. That is, the EGR gas can flow through the EGR valve 230. In other words, a flow of the EGR gas is generated in the EGR valve 230. Therefore, even when the valve body 223 is closed, the EGR gas is likely to come into contact with the temperature sensitive portion 227. This allows the valve body 223 to open and close the EGR valve 230 in accordance with the EGR gas temperature.

(4) The temperature sensitive portion 227 drives the valve body 223 to open and close the EGR valve 230. Specifically, the temperature sensitive portion 227 drives the valve body 223 by a mechanical/physical reaction based on the EGR gas temperature. A second comparative example includes an EGR valve configured to control driving of a valve body by using, for example, an electromagnetic valve. The present embodiment is more cost efficient than the second comparative example. The configuration in which the mechanical/physical reaction is used to drive the valve body 223 may have drawbacks in terms of controllability of the amount of the drawn-in EGR gas.

In this regard, the fuel of the internal combustion engine 1 of the present embodiment is hydrogen gas. In the internal combustion engine 1, which uses hydrogen gas as fuel, the flammable range of air-fuel mixture containing hydrogen gas is broader than that in an internal combustion engine using gasoline as fuel. In other words, the present embodiment has a higher tolerance for misfires. Therefore, precise control over the amount of the drawn-in EGR gas is not required in the present embodiment. In the present embodiment, even though the EGR device 200 of the internal combustion engine 1, which uses hydrogen gas as fuel, is provided with the EGR valve 230, which includes the above-described temperature sensitive portion 227, there is little hindrance to controllability. Therefore, an inexpensive EGR valve can be employed while suppressing the occurrence of misfires.

(5) The second comparative example will now be considered, in which the operation of the valve body of the EGR valve is controlled by using an electromagnetic valve or the like. The second comparative example requires development man-hours for programs used to control the electromagnetic valve, man-hours for obtaining suitable values for control, and a drive circuit for driving the electromagnetic valve. The second comparative example is thus costly. In this regard, the EGR valve 230 of the present embodiment includes the temperature sensitive portion 227, which operates the valve body 223. Therefore, the present embodiment eliminates the need for programs and a drive circuit, thereby suppressing associated costs.

Modifications

The above-described embodiment may be modified as follows. The above-described embodiment and the following modifications can be combined as long as the combined modifications remain technically consistent with each other.

The internal combustion engine 1 may burn an air-fuel mixture having an air excess ratio of 1 or less when the EGR valve 230 is open. An air excess ratio of 1 or less corresponds to, for example, rich combustion.

Figure 4:
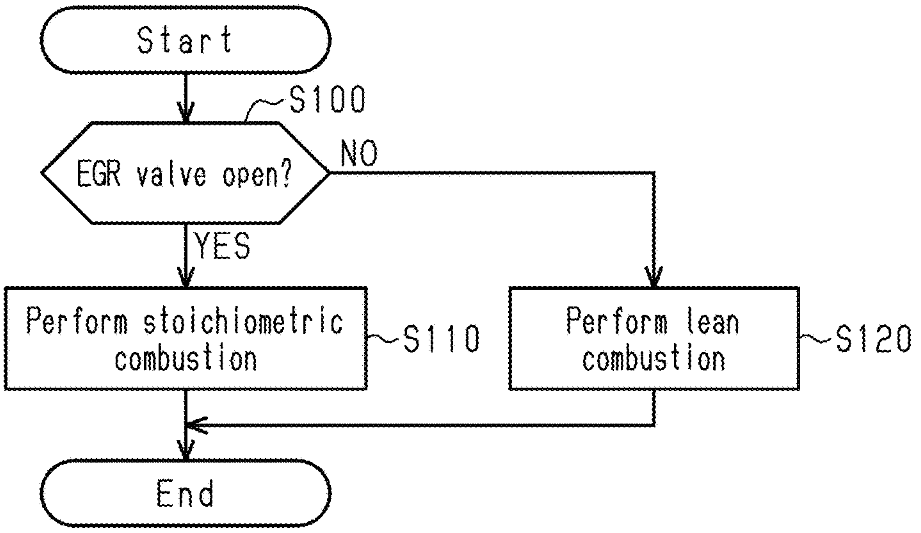
FIG. 4 is a flowchart showing a procedure of processes executed by a controller according to a modification.

FIG. 4 shows a procedure of processes executed by the controller 100 in order to implement this modification. The processes shown in FIG. 4 are implemented by the CPU 110 executing a program stored in the memory 120 of the controller 100 or a program product at specified intervals. In the following description, the number of each step is represented by the letter S followed by a numeral.

In the series of processes shown in FIG. 4, the controller 100 determines whether the EGR valve 230 is open (S100). In the process of S100, any suitable method may be employed to determine whether the EGR valve 230 is open. For example, when the EGR gas is drawn into the intake passage 4 by opening the EGR valve 230, the air-fuel ratio AF detected by the air-fuel ratio sensor 65 changes. The controller 100 thus determines that the EGR valve 230 is open when determining that a change in the air-fuel ratio AF has been detected.

When it is determined that the EGR valve 230 is open in the process of S100 (S100: YES), the controller 100 performs stoichiometric combustion (S110). The stoichiometric combustion is an example of combustion with an air-fuel mixture having an air excess ratio of 1 or less. The controller 100 performs stoichiometric combustion by adjusting the opening degree of the throttle valve 3 and the amount of fuel injected from the fuel injection valves 5. Alternatively, the process of S110 may be performed through rich combustion, which is an example of combustion with an air-fuel mixture having an air excess ratio of 1 or less.

In contrast, when it is not determined that the EGR valve 230 is open in the process of S100 (S100: NO), that is, when the EGR valve 230 is closed, the controller 100 performs lean combustion (S120). Lean combustion refers to combustion with an air-fuel mixture having an air excess ratio exceeding 1. In the present embodiment, combustion with an air-fuel mixture having an air excess ratio significantly exceeding 1 is executed as the lean combustion by the process of S120. The controller 100 performs the lean combustion by adjusting the opening degree of the throttle valve 3 and the amount of fuel injected from the fuel injection valves 5.

After executing the process of S110 or the process of S120, the controller 100 temporarily ends this process.

In the modification shown in FIG. 4, when the EGR valve 230 is open, combustion is performed using an air-fuel mixture having an air excess ratio of 1 or less. In other words, stoichiometric combustion or rich combustion is performed. The output of the internal combustion engine 1 during stoichiometric combustion or rich combustion is higher than the output during lean combustion, which uses an air-fuel mixture having an air excess ratio significantly exceeding 1. On the other hand, in stoichiometric combustion or rich combustion, the amount of generated NOx tends to increase. In the modification shown in FIG. 4, when the EGR valve 230 is open and thus the EGR gas is fully drawn into the intake passage 4, combustion with an air-fuel mixture having an air excess ratio of 1 or less is performed. This suppresses generation of NOx, while increasing the output of the internal combustion engine 1.

In the above-described embodiment, the valve body 223 includes the valve body through-hole 229. Instead of or in addition to the valve body through-hole 229, the EGR valve 230 may include a bypass passage through which the EGR gas flows while bypassing the valve body 223.

Figure 5:
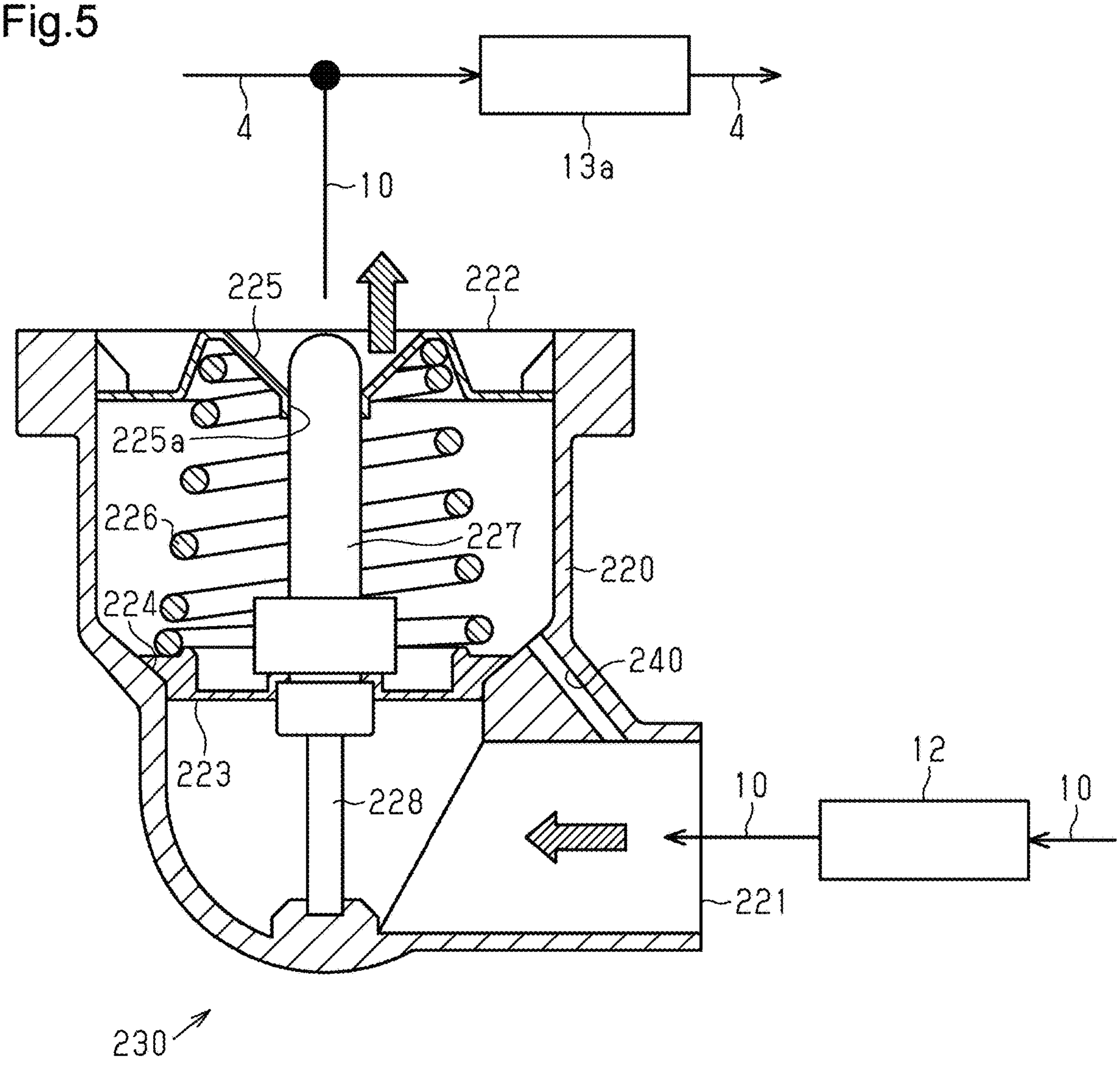
FIG. 5 is a cross-sectional view of an EGR valve according to another modification.

FIG. 5 shows a cross-sectional structure of an EGR valve 230 of the modification. As shown in FIG. 5, the valve body 223 in this modification is not provided with the valve body through-hole 229 shown in FIG. 2. However, the EGR valve housing 220 shown in FIG. 5 includes a bypass passage 240 formed therein. The bypass passage 240 allows the EGR gas that has flowed into the EGR inlet 221 to flow to the EGR outlet 222 while bypassing the valve body 223. It is desirable that the extending direction of the bypass passage 240 be set such that the EGR gas having flowed out from the bypass passage 240 is directed toward the temperature sensitive portion 227. The bypass passage 240 does not necessarily need to be formed in the EGR valve housing 220. The bypass passage 240 may be provided on the EGR valve housing 220 while being formed separately from the EGR valve housing 220.

In the modification of FIG. 5, even when the valve body 223 closes the EGR valve 230, the EGR gas passes through the bypass passage 240 to flow into the EGR valve 230. Thus, a flow of the EGR gas is generated in the EGR valve 230. Therefore, even when the valve body 223 closes the EGR valve 230, the EGR gas is likely to come into contact with the temperature sensitive portion 227. This allows the temperature sensitive portion 227 to operate the valve body 223 in accordance with the EGR gas temperature.

In a further modification from the modification of FIG. 5, the valve body 223 may have both the valve body through-hole 229 shown in FIG. 2 and the bypass passage 240 shown in FIG. 5.

The internal combustion engine 1 described above uses hydrogen gas as fuel, but may use another fuel. This will achieve the advantages described above except for advantage (4).

The temperature sensitive material included in the temperature sensitive portion 227 is wax, but another temperature sensitive material may be used. Examples of other temperature sensitive materials of the temperature sensitive portion 227 include shape memory alloys and bimetals.

The EGR device 200 shown in FIG. 1 is of a low-pressure type. Specifically, the EGR passage 10 branches from a section of the exhaust passage 6 that is downstream of the turbine housing 13*b*. The EGR passage 10 is connected to a section of the intake passage 4 that is upstream of the compressor housing 13*a*. Alternatively, the EGR device 200 may be of a high-pressure type. A high-pressure type EGR device is branched from a section of the exhaust passage 6 that is upstream of the turbine housing 13*b*. The EGR passage 10 may be connected to a section of the intake passage 4 that is downstream of the throttle valve 3. The EGR passage 10 may also be connected to the surge tank 2, which is downstream of the throttle valve 3.

The controller 100 includes the CPU 110 and the memory 120, and executes software processing. However, this is only an example. For example, the controller 100 may include a dedicated hardware circuit (e.g. an application specific integrated circuit: ASIC) that executes at least part of the software processing executed in the above-described embodiment. That is, the controller 100 may be modified as long as it has any one of the following configurations (a) to (c). (a) A configuration including a processor that executes all of the above-described processes according to programs or program products, and a program storage device such as a memory that stores the programs. (b) A configuration including a processor and a program storage device that execute part of the above-described processes according to a program, and a dedicated hardware circuit that executes the remaining processes. (c) A configuration including a dedicated hardware circuit that executes all of the above-described processes. Multiple software circuits each including a processor and a program storage device and multiple dedicated hardware circuits may be provided. That is, the above processes may be executed in any manner as long as the processes are executed by processing circuitry that includes at least one of a set of one or more software circuits and a set of one or more dedicated hardware circuits. The program storage device, which is a non-transitory computer-readable storage medium, includes any type of medium that is accessible by general-purpose computers or dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An exhaust gas recirculation device for an internal combustion engine, the exhaust gas recirculation device comprising: an EGR passage that delivers some of exhaust gas of the internal combustion engine to an intake passage of the internal combustion engine as an EGR gas; an EGR cooler provided in the EGR passage, the EGR cooler performing heat exchange between coolant of the internal combustion engine and the EGR gas; and an EGR valve provided in a section of the EGR passage that is between the intake passage and the EGR cooler, wherein the EGR valve includes: a temperature sensitive portion with which the EGR gas comes into contact, an EGR gas temperature being a temperature of the EGR gas that comes into contact with the temperature sensitive portion; a displaceable valve body that opens the EGR valve when the EGR gas temperature is higher than a prescribed temperature, thereby allowing the EGR gas to flow, wherein the displaceable valve body includes a through-hole in which some of the EGR gas can pass while the displaceable valve body is closed.

2. The exhaust gas recirculation device for an internal combustion engine according to claim 1, wherein the temperature sensitive portion is disposed in a section downstream of the displaceable valve body in a flow direction of the EGR gas.

3. An exhaust gas recirculation device for an internal combustion engine, the exhaust gas recirculation device comprising:

an EGR passage that delivers some of exhaust gas of the internal combustion engine to an intake passage of the internal combustion engine as an EGR gas;

an EGR cooler provided in the EGR passage, the EGR cooler performing heat exchange between coolant of the internal combustion engine and the EGR gas; and an EGR valve provided in a section of the EGR passage that is between the intake passage and the EGR cooler, wherein the EGR valve includes:

a temperature sensitive portion with which the EGR gas comes into contact, an EGR gas temperature being a temperature of the EGR gas that comes into contact with the temperature sensitive portion, and a displaceable valve body that opens the EGR valve when the EGR gas temperature is higher than a prescribed temperature, thereby allowing the EGR gas to flow, wherein the temperature sensitive portion is disposed in a section downstream of the displaceable valve body in a flow direction of the EGR gas, the EGR valve includes a bypass passage, the EGR gas bypasses the displaceable valve body by flowing through the bypass passage, and the bypass passage is formed so that the EGR gas flowing out of the bypass passage is directed toward the temperature sensitive portion.

4. The exhaust gas recirculation device for an internal combustion engine according to claim 1, wherein the fuel of the internal combustion engine is hydrogen gas.

5. The exhaust gas recirculation device for an internal combustion engine according to claim 1, wherein, when the EGR valve is open, an air-fuel mixture burned in the internal combustion engine has an air excess ratio of 1 or less.

6. An exhaust gas recirculation method for an internal combustion engine, the exhaust gas recirculation method being executed by processing circuitry, the method comprising: introducing some of exhaust gas of the internal combustion engine into an intake passage of the internal combustion engine as an EGR gas by causing the exhaust gas to pass through the EGR passage; and using an EGR cooler provided in the EGR passage, thereby performing heat exchange between coolant of the internal combustion engine and the EGR gas, an EGR valve is provided in a section of the EGR passage that is between the intake passage and the EGR cooler, wherein the EGR valve includes a displaceable valve body and a temperature sensitive portion with which the EGR gas comes into contact, an EGR gas temperature is a temperature of the EGR gas in contact with the temperature sensitive portion of the EGR valve, wherein the temperature sensitive portion is disposed in a section downstream of the displaceable valve body in a flow direction of the EGR gas, and wax is sealed inside the temperature sensitive portion, and the displaceable valve body opens the EGR valve when the EGR gas temperature is higher than a prescribed temperature, and wherein the displaceable valve body includes a through-hole in which some of the EGR gas can pass while the displaceable valve body is closed.

7. The exhaust gas recirculation device for an internal combustion engine according to claim 6, wherein the EGR valve is actuated by the temperature sensitive portion such that the temperature sensitive portion drives the displaceable valve body to open and close the EGR valve.

8. The exhaust gas recirculation method for an internal combustion engine according to claim 6, wherein the prescribed temperature is a lowest temperature of the EGR gas at which generation of condensed water is suppressed.

* * * * *